US008845183B2

(12) United States Patent
Kozlowski et al.

(10) Patent No.: US 8,845,183 B2
(45) Date of Patent: *Sep. 30, 2014

(54) TORQUE LIMITING DISPOSABLE AGITATOR FOR A FOOD MIXER

(71) Applicant: Vita-Mix Corporation, Cleveland, OH (US)

(72) Inventors: Eugene J. Kozlowski, Medina, OH (US); Raymond Seuffert, Solon, OH (US)

(73) Assignee: Vita-Mix Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,936

(22) Filed: Apr. 3, 2013

(65) Prior Publication Data

US 2013/0223183 A1   Aug. 29, 2013

Related U.S. Application Data

(63) Continuation of application No. 13/065,905, filed on Apr. 1, 2011, now Pat. No. 8,414,183.

(51) Int. Cl.
| | | |
|---|---|---|
| A47J 43/044 | (2006.01) | |
| A23G 9/12 | (2006.01) | |
| B01F 13/04 | (2006.01) | |
| B01F 7/00 | (2006.01) | |
| A47J 43/07 | (2006.01) | |
| A23G 9/22 | (2006.01) | |

(52) U.S. Cl.
CPC .............. *B01F 7/00666* (2013.01); *A23G 9/12* (2013.01); *B01F 13/045* (2013.01); *A47J 43/0711* (2013.01); *B01F 7/001* (2013.01); *A23G 9/224* (2013.01); *B01F 7/0005* (2013.01); *B01F 7/00025* (2013.01); *B01F 7/00333* (2013.01)
USPC .............................................. 366/343; 416/2

(58) Field of Classification Search
CPC ...................................................... A47J 43/0711
USPC .............................................. 366/343; 416/2
See application file for complete search history.

(56) References Cited

U.S. PATENT DOCUMENTS

| | | | | |
|---|---|---|---|---|
| 2,658,363 | A * | 11/1953 | Simmons ........................ | 24/486 |
| 2,877,547 | A * | 3/1959 | Feaster .............................. | 30/1 |
| 4,159,182 | A * | 6/1979 | Adolfson ...................... | 366/343 |
| 4,610,087 | A * | 9/1986 | Mickelson et al. ............. | 30/147 |
| 4,946,287 | A * | 8/1990 | Barnard et al. ............... | 366/343 |
| 8,414,183 | B2 * | 4/2013 | Kozlowski et al. ........... | 366/343 |

* cited by examiner

*Primary Examiner* — David Sorkin
(74) *Attorney, Agent, or Firm* — Renner, Kenner, Greive, Bobak, Taylor & Weber

(57) ABSTRACT

An agitator (10) includes a stem (11) having a shaft coupler (12) at one end adapted to be attached to the rotatable shaft (25) of a food mixing machine. The other end of the stem (11) has a mixing blade (13) which can be in the shape of the bowl of a spoon. The stem (11) is shaped like an I-beam having side walls (20) spaced by a central wall (21). The side walls (20) have opposed notches (22) leaving a web (23) therebetween, and the central wall (21) is provided with an aperture (24) which is aligned with the web (23). Together the web (23) and the aperture (24) define a weakened area where the stem (11) will break upon a predetermined torque which is established based on the hardness of the food product (26) being mixed.

6 Claims, 3 Drawing Sheets

TORQUE LIMITING DISPOSABLE AGITATOR FOR A FOOD MIXER

CROSS-REFERENCE TO RELATED APPLICATION

This application claims priority from U.S. patent application Ser. No. 13/065,905 filed on Apr. 1, 2011, which is incorporated herein by reference in its entirety.

TECHNICAL FIELD

This invention relates to a disposable agitator for mixing food products, such as ice cream or the like, which is formed in the shape of a spoon so that the user may utilize it to consume the food after the mixing is complete. More specifically, this invention relates to such an agitator, and its method of construction, which will break cleanly at a predetermined location discernable to the user if the food product is too hard.

BACKGROUND ART

Food mixing machines are commonly utilized by convenience stores, fast food establishments or the like, particularly those that blend condiments or other foods into ice cream in a container for consumption by the customer with a spoon. The blending is typically performed by an agitator carried at the bottom of a rotating shaft. The ice cream and other foods to be blended are provided to the user in a container, and the agitator is positioned in the ice cream to blend the product. After use, the agitator must be cleaned to avoid contamination of the next product to be blended.

In order to avoid the step of cleaning the agitator, disposable plastic agitators have been developed which are placed on the rotating shaft prior to use, and removed from the rotating shaft after use. As a result, the shaft does not need to be cleaned between each usage.

Some of those disposable agitators have been formed in the shape of a spoon. In those devices, the bowl of the spoon mixes the product and the stem of the spoon is hollow and is positioned by the user over at least a portion of the rotatable shaft of the food mixer. The spoon shaft is provided with a clip which is snapped over a rib provided on the rotatable shaft to attach the spoon to the shaft. The product is then blended by the user and the spoon removed from the shaft. This system is advantageous not only because of the saving of time by not having to clean the agitator after each use, but also the spoon can be used by the customer to consume the food thereby saving the establishment the cost of providing a conventional spoon to the customer.

However, if these plastic agitators are attempted to be utilized to mix ice cream or other products which are too hard, as by being too cold, it is possible that when the bowl of the spoon is placed in the ice cream and the agitator rotated, the agitator could break as it is twisted. Such breakage, if left uncontrolled, would occur at a random location along the stem of the spoon which could create sharp or jagged edges along the stem of the spoon. The random breakage could also occur at the bowl of the spoon and could result in small fragments of the bowl of the spoon being disposed in the blended product, or could result with the bowl of the spoon having sharp edges. In either instance, such breakage of the spoon could constitute a potential safety risk to an individual failing to inspect the spoon prior to using it to consume the blended product.

Thus, the need exists to provide a disposable plastic spoon-shaped agitator which, if breakage does occur, will not break randomly but rather will break cleanly at a location easily discerned by the customer.

DISCLOSURE OF THE INVENTION

It is thus an object of one aspect of the present invention to provide a rotatable agitator for a food mixer which will break at a predetermined location when encountering a torque force of a predetermined size resisting the rotation.

It is an object of another aspect of the present invention to provide an agitator, as above, which when used to mix ice cream will break at a predetermined temperature of the ice cream.

It is an object of another aspect of the present invention to provide a method of constructing the agitator with the above-described features.

These and other objects of the present invention, as well as the advantages thereof over existing prior art forms, which will become apparent from the description to follow, are accomplished by the improvements hereinafter described and claimed.

In general, an agitator adapted to be attached to a rotatable shaft to mix food includes a stem, a shaft coupler at one end of the stem adapted to be attached to the shaft, and a blade for mixing the food at the other end of the stem. The stem has a weakened area where the stem will break if a predetermined amount of torque is encountered by the agitator.

A method of constructing an agitator for mixing foods and having a stem which will break when a predetermined torque is encountered by the stem includes the step of providing a weakened area in the stem at a desired discernible location along the stem.

Another method for constructing an agitator for mixing food and having a stem which will break when a predetermined torque is encountered includes the steps of providing a weakened area in the stem, and determining the size of the weakened area depending on the size of the predetermined torque.

A preferred exemplary rotatable agitator according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
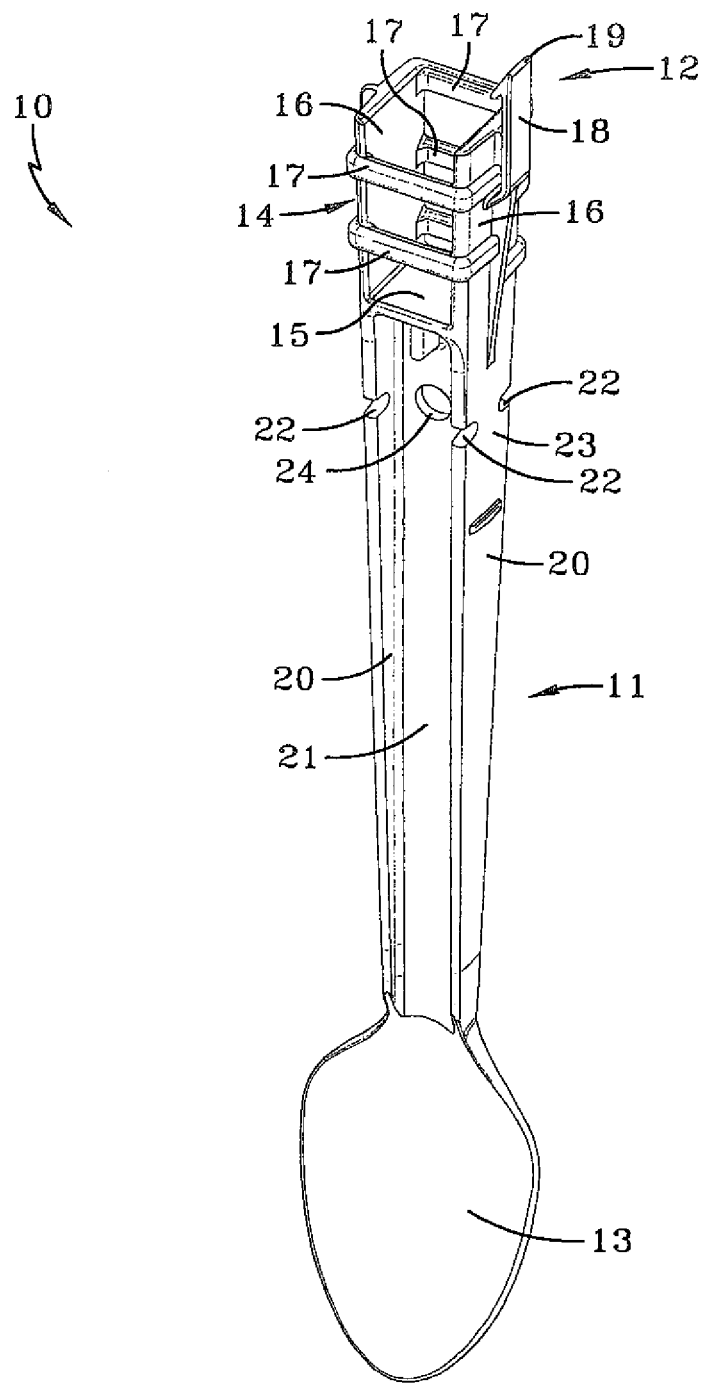
FIG. 1 is a perspective view of an agitator made in accordance with the present invention.
Figure 2:
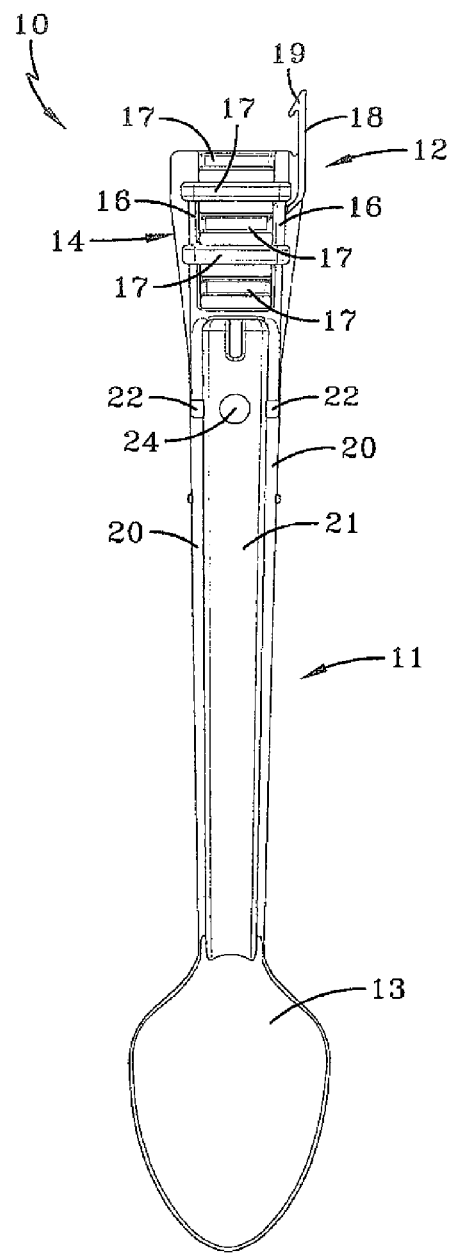
FIG. 2 is a front elevational view of the agitator of FIG. 1.
Figure 3:
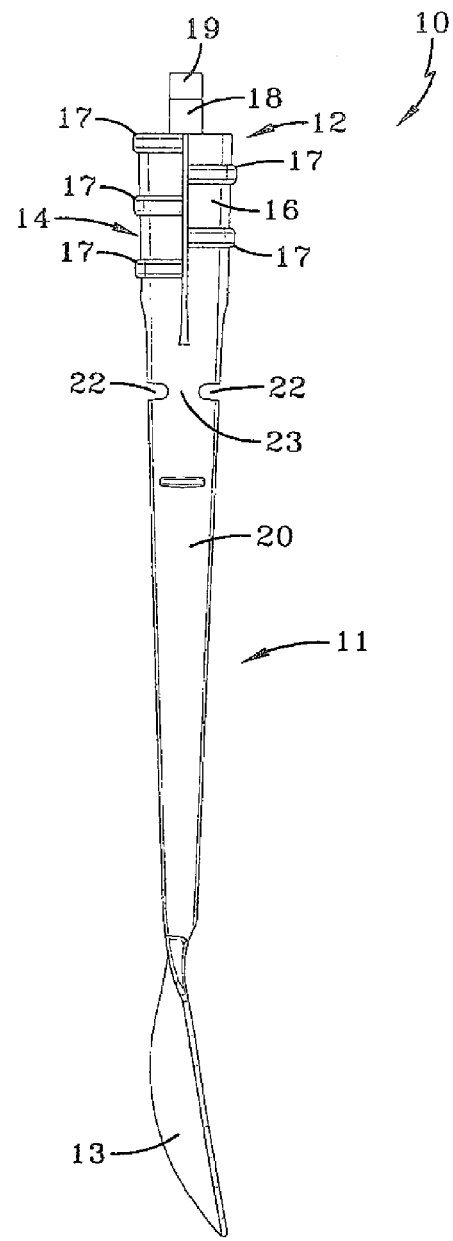
FIG. 3 is a side elevational view of the agitator of FIG. 1.

A food mixing agitator made in accordance with the present invention is generally indicated by the numeral 10. Agitator 10 is preferably made of a copolyester or polycarbonate plastic material and can take on any conventional shape, but is advantageously shown as being in the shape of a spoon. As such, agitator 10 includes a stem portion, generally indicated by the numeral 11, a shaft coupler portion, generally indicated by the numeral 12 and formed at one end of stem portion 11, and a blade portion 13 which is in the shape of the bowl of a spoon and which is formed at the other end of stem portion 11.

Coupler portion 12 of agitator 10 includes a generally rectangular hollow socket generally indicated by the numeral 14 and having an open top. Socket 14 is defined by a bottom surface 15, opposed side walls 16 extending upwardly from bottom surface 15, and opposed offset slats 17 extending between side walls 16. A flexible clip 18 is carried by one of the side walls 16 and extends upwardly over the top of socket 14. A lock barb 19 is positioned on clip 18 above the top of socket 14.

The stem portion 11 of agitator 10 is in the shape of an I-beam and includes opposed side walls 20 spanned by a central wall 21. Walls 20 and 21 extend downwardly from bottom surface 15 of socket 14 to blade portion 13. This I-beam shape provides strength to spoon agitator 10 to resist potential torque and breakage when in operation.

However, if agitator 10 is used to mix extremely frozen or hard material, breakage of the blade portion 13 or even the I-beam stem portion 11 could occur on a random basis which, particularly if unnoticed, could injure the user as previously described. To assure that if any breakage occurs, that it will always occur at one discernible location, I-beam side walls 20 are provided with opposed slots or notches 22 which extend inwardly toward each other leaving a web 23 therebetween. An aperture 24 is provided through central wall 21 and is preferably generally aligned with notches 22 and web 23. As such, notches 22, web 23, and aperture 24 define a weakened area of the stem portion 11 of agitator 10. As will hereinafter be more fully described, if agitator 10 is to fracture, side walls 20 will do so at the weakened area of web 23, and central wall 21 will fracture at the area of aperture 24.

Agitator 10 is intended to be used primarily in conjunction with a machine that mixes food products. For a full understanding of understanding of a typical machine and its operation, reference is made to pending U.S. patent application Ser. No. 12/460,273 filed on Jul. 17, 2009, which is incorporated herein by reference.

Figure 4:
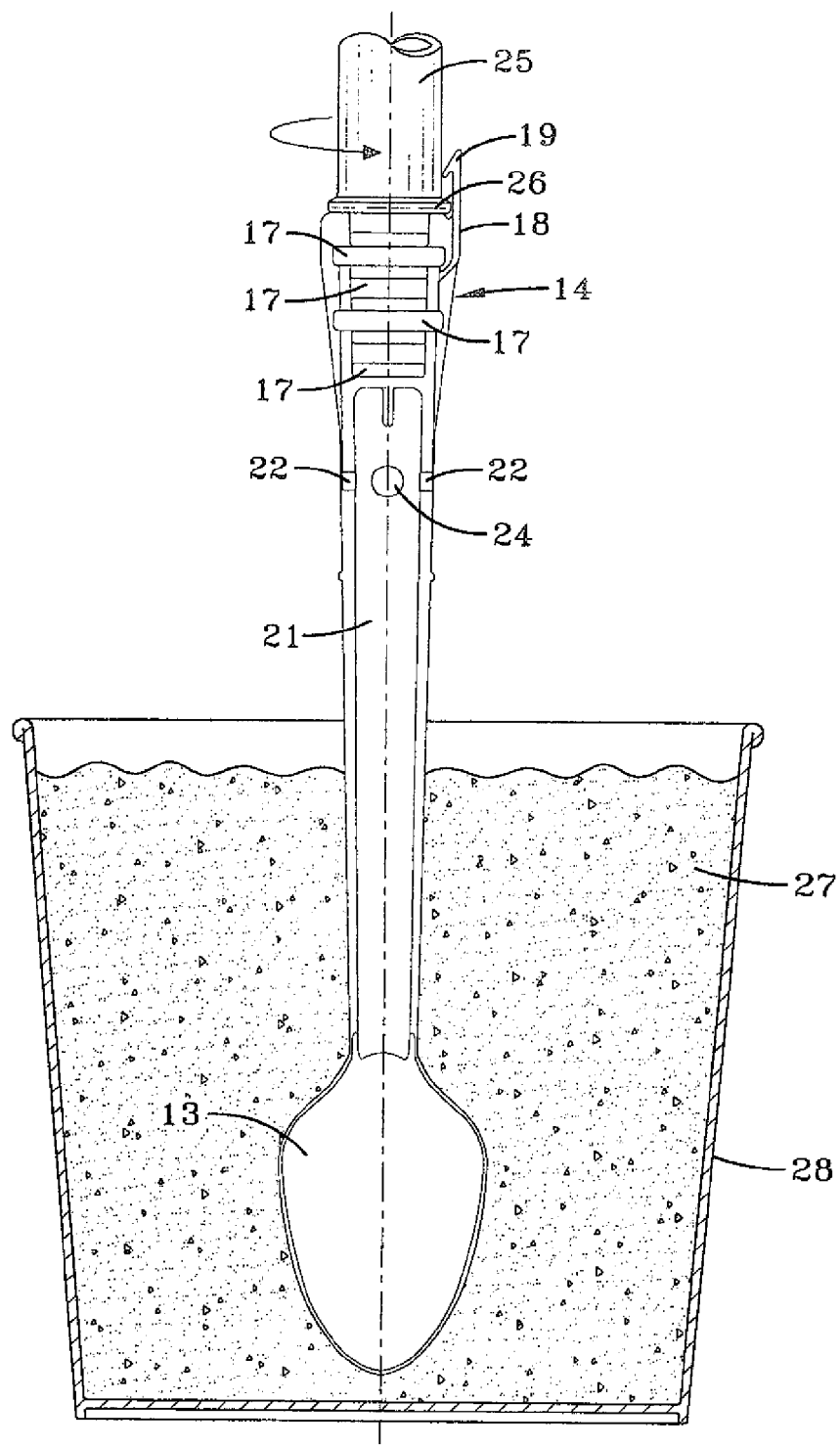
FIG. 4 is a somewhat schematic view showing the agitator attached to a rotatable shaft and mixing ice cream in a cup.

In such a machine, agitator 10 is attached to a shaft 25, as shown in FIG. 4, for rotation therewith. Such is accomplished by positioning the driver end of shaft 25 into the socket 14. As the agitator 10 is being moved upwardly to accomplish such connection, clip 18 flexes until lock barb 19 engages a flange 26 on the driver end of shaft 25. Agitator 10 may be manually removed from shaft 25 by merely pulling down an agitator 10, or the mixing machine may be provided with an automatic agitator ejection system.

As shown, in FIG. 4, when agitator 10 is positioned in a food product 27, such as ice cream provided in a cup 28, shaft 25 begins to rotate and the blade portion 13 begins to mix the food 27. But if the food is too hard and thereby resists rotation of blade portion 13, and if the torque generated on stem 11 exceeds a predetermined amount, before any other breakage can occur, stem 11 will sever at the weakened area defined by notches 22 and 23 and aperture 24. Such will essentially tear the copolyester material of agitator 10 at the weakened area rather than allowing it to randomly break at other areas.

The size of the notches 22 and 23 and therefore the size of the web 23, and the size of the aperture 24, as well as the material of agitator 10, dictate at what torque amount the stem 11 will break. For example, by making web 23 smaller, stem 11 would break with less torque. Similarly, by making aperture 24 bigger, stem 11 would break with less torque. Thus, the amount of torque force needed to break stem 11 can be controlled by adjusting the size of web 23, aperture 24 or both.

When mixing ice cream, the torque placed on stem 11 is a function primarily of the temperature of the ice cream. Typically, cups of ice cream when delivered to a convenience store or the like may be as cold as −15° F. As they are stored at the establishment, they may warm up to 6° F. for use by the consumer. At such temperatures, stem breakage is typically not a problem. However, if the cup is served when too cold, for example, at −6° F., stem breakage could begin to be a problem. As a result, at least as a starting point, the size of web 23 and aperture 24 may be set to allow stem 11 to sever at the weakened area if the ice cream is of a hardness exemplified at −6° F. It has been found that a web 23 of about 0.2 inch and an aperture 24 of about that same dimension will permit breakage of the stem at −6° F.

In light of the foregoing, it should thus be evident that a an agitator for a food mixer constructed as described herein substantially improves the art and otherwise accomplishes the objects of the present invention.

What is claimed is:

1. A food mixing agitator adapted to be attached to a rotatable shaft of a food mixing machine comprising:
    a stem having a first end portion and a second end portion;
    a coupler portion positioned at the first end portion of the stem wherein the coupler portion includes a socket configured to engage the shaft of the food mixing machine; and
    a mixing portion positioned at the second end portion of the stem,
    wherein the stem includes a weakened area positioned adjacent to said socket near the first end portion of the stem, the weakened area being configured to break when a torque generated on the stem during a mixing operation exceeds a predetermined amount.

2. The food mixing agitator of claim 1, wherein the weakened area is positioned closer to the coupler portion than the mixing portion of the stem.

3. The food mixing agitator of claim 1, wherein the weakened area includes at least one notch provided in the stem.

4. The food mixing agitator of claim 1, wherein the mixing portion is a spoon-shaped blade.

5. The food mixing agitator of claim 1, wherein the predetermined torque is based on a hardness of a food to be mixed by the agitator.

6. A food mixing agitator comprising:
    a longitudinally extending stem having opposed lateral edges defining a lateral width and having a first end portion and a second end portion;
    a coupler portion positioned at the first end portion of the stem; and
    a mixing portion positioned at the second end portion of the stem;
    wherein the stem includes a weakened area near the first end portion of the stem, the weakened area including two spaced notches on one lateral edge and two spaced notches on the opposed lateral edge, said notches not extending through said lateral width and being sized so as to break when a torque generated on the stem during a mixing operation exceeds a predetermined amount.

* * * * *